(12) United States Patent
Wu et al.

(10) Patent No.: US 10,929,712 B2
(45) Date of Patent: Feb. 23, 2021

(54) EMBEDDED VARIABLE LINE PATTERNS FOR IMAGES

(71) Applicant: MorphoTrust USA, LLC, Billerica, MA (US)

(72) Inventors: Yecheng Wu, Lexington, MA (US); Robert L. Jones, Andover, MA (US); Brian K. Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 16/671,018

(22) Filed: Oct. 31, 2019

(65) Prior Publication Data
US 2020/0175323 A1 Jun. 4, 2020

Related U.S. Application Data

(63) Continuation of application No. 15/857,032, filed on Dec. 28, 2017, now abandoned.
(Continued)

(51) Int. Cl.
*G06K 9/62* (2006.01)
*G07F 7/08* (2006.01)
(Continued)

(52) U.S. Cl.
CPC ........... *G06K 9/6227* (2013.01); *B42D 25/23* (2014.10); *G06K 9/00577* (2013.01); *G06K 19/077* (2013.01); *G06K 19/16* (2013.01); *G06K 19/18* (2013.01); *G07D 7/005* (2017.05); *G07D 7/2008* (2013.01); *G07D 7/2033* (2013.01);
(Continued)

(58) Field of Classification Search
USPC ......................................................... 235/380
See application file for complete search history.

(56) References Cited

U.S. PATENT DOCUMENTS

| 5,703,695 A | 12/1997 | Nguyen |
| 2004/0076310 A1 | 4/2004 | Hersch et al. |

(Continued)

FOREIGN PATENT DOCUMENTS

FR  3036310 A1  11/2016

OTHER PUBLICATIONS

Extended European Search Report in European Appln. No. 17888826.9, dated Nov. 26, 2019, 8 pages.
(Continued)

*Primary Examiner* — Rafferty D Kelly
(74) *Attorney, Agent, or Firm* — Fish & Richardson P.C.

(57) ABSTRACT

In some implementations, a system is capable of generating identifications that include distinctive line patterns corresponding to different portions of secure customer information. Data indicating an input image, and a dithering matrix representing a two-dimensional array of pixel values is obtained. Pixel values of pixels included in the input image are transformed using the dithering matrix. For each pixel within the input image, the transformation includes identifying a particular pixel value within the dithering matrix that represents a particular pixel within the input image, and adjusting an intensity value of the particular pixel based on attributes of the dithering matrix. A transformed image is generated based on the transformation and then provided for output.

20 Claims, 5 Drawing Sheets

Related U.S. Application Data

(60) Provisional application No. 62/440,888, filed on Dec. 30, 2016.

(51) Int. Cl.
| | |
|---|---|
| *G07D 7/20* | (2016.01) |
| *G06K 9/00* | (2006.01) |
| *B42D 25/23* | (2014.01) |
| *G07D 7/005* | (2016.01) |
| *G06K 19/077* | (2006.01) |
| *G06K 19/16* | (2006.01) |
| *G06K 19/18* | (2006.01) |
| *G07D 7/2033* | (2016.01) |
| *H04N 1/32* | (2006.01) |

(52) U.S. Cl.
CPC ............ *G07F 7/082* (2013.01); *G07F 7/0826* (2013.01); *H04N 1/32149* (2013.01); *G06K 2009/0059* (2013.01)

(56) References Cited

U.S. PATENT DOCUMENTS

| | | | |
|---|---|---|---|
| 2005/0052705 A1* | 3/2005 | Hersch | ................... B41M 3/14 |
| | | | 358/3.28 |
| 2006/0280331 A1 | 12/2006 | Chosson et al. | |
| 2008/0159615 A1 | 7/2008 | Rudaz et al. | |

OTHER PUBLICATIONS

International Search Report in International Application No. PCT/US2017/068072, dated Feb. 22, 2018, 23 pages (with English translation).

\* cited by examiner

EMBEDDED VARIABLE LINE PATTERNS FOR IMAGES

CROSS-REFERENCE TO RELATED APPLICATIONS

This application is a continuation of U.S. application Ser. No. 15/857,032 filed Dec. 28, 2017 which claims the benefit of U.S. Provisional Patent Application No. 62/440,888, filed on Dec. 30, 2016 and titled "EMBEDDED VARIABLE LINE PATTERNS," which is incorporated herein by reference in its entirety.

FIELD

The present specification is related to physical and digital identifications.

BACKGROUND

User identifications such as driver licenses can be issued either as physical identification cards or digital identifications. A physical identification card is issued by creating a card that includes customer information, whereas a digital identification is issued in an electronic format and accessed on a client device. Both physical and digital identifications are commonly used for verifying the identity of an individual, providing access to restricted areas, or authorizing an individual to purchase age-restricted content.

SUMMARY

Identifications are often provided to customers by issuing authorities such as government agencies or companies during an issuance process. These identifications often include customer information that is used to identify the identity of the customer, and in some instances, provide access or privileges to the customer. However, security features for physical identification cards or digital identifications are often pre-configured during the issuance process and unable to be adjusted after issuance. As a result, such identifications are often susceptible to risk of fraud and counterfeiting when the pre-configured security features become compromised. In addition, besides the use of a unique identification number, many issued identifications often include general security features (e.g., holographic images, pre-configured background patterns) that are applicable to a general population of users that have been issued the same identification.

In some implementations, a system is capable of generating identifications that include distinctive line patterns corresponding to different portions of secure customer information. For example, the system may construct or modify photographic images of an identification, such as a customer photo, a background pattern, or a portion of text, using line patterns that include different line thicknesses and line spacing. The system can then associate each line pattern with a corresponding portion of secure customer information. The system can also place multiple line patterns in different regions of the photographic images within the identification.

The system can also determine and/or confirm the authenticity of an identification based on verifying the secure customer information corresponding to each line pattern. For example, the system can verify an identification based on the presence of verified line patterns within the identification, a verified arrangement of the distinctive line patterns within the identification, or both. Once the identification has been issued, the system can detect the embedded line patterns within the identification to identify secure customer information that is assigned to the embedded line patterns within an identification repository. In some instances, the identified secure customer information can also be used to authenticate the customer during an electronic transaction where the identification is provided to claim a user identity.

In some implementations, the system can periodically adjust the line patterns that are included within an identification in relation to, for example, an identification issuance and/or identification renewal process. For example, line patterns included within a physical identification card can be adjusted each time a new physical identification is issued. For digital identifications, the system can periodically reconstruct photographic images of the digital identification using time-dependable line patterns that are valid for specified time periods in order to adjust the line patterns used to generate the digital identification. Adjustments to the line patterns can be stored in a customer account in order to identify use of prior instances of identifications that have become invalid (e.g., through a detection of an expired line pattern), or represent fraudulent or unauthorized use of an expired identification.

The line patterns embedded within the identification may or may not be visible to the human eye. In some implementations, the line patterns can be made large enough to enable manual verification using human eyes. In other implementations, the line patterns can be constructed to be small enough such that the graphic elements are visible to the human eye, but the embedded line patterns appear invisible. In such implementations, the line patterns can be detected using a detector device that uses specific optical scanning techniques to detect the embedded line patterns. In some implementations, a combination of eye-detectable and machine-readable line patterns can be included in order to improve the security features of the identification.

In one general aspect, a method can be performed on by one or more processors. The method includes the operations of: obtaining data indicating (i) an input image, and (ii) a dithering matrix representing a two-dimensional array of pixel values; and transforming, using the dithering matrix, pixel values of pixels included in the input image. Transforming the pixel values of pixels included in the input image, includes identifying, for each pixel within the input image, a particular pixel value within the dithering matrix that represents a particular pixel within the input image. The particular pixel value has a coordinate location within the two-dimensional array corresponding to a coordinate location of the particular pixel within the input image. Transforming the pixel values of pixels included in the input image also includes adjusting, for each pixel within the input image, an intensity value of the particular pixel based on attributes of the dithering matrix.

The method also includes the operations of: generating a transformed image based on transforming the pixel values of the pixels included in the input image, wherein at least a portion of the transformed image comprises a dithering pattern; and providing the transformed image for output.

One or more implementations can include the following optional features. For example, in some implementations, the dithering pattern includes a vertical parallel line pattern.

In some implementations, the dithering pattern is a horizontal parallel line pattern.

In some implementations, the attributes of the dithering matrix comprise at least one of: horizontal and vertical dimensions of the two-dimensional array of pixel values, a range of pixel values included in the two-dimensional array of pixel values, and an arrangement of pixel values within the two-dimensional array of pixel values.

In some implementations, adjusting the intensity value of the particular pixel includes: determining a scaling factor based on (i) a range of intensity values for pixels included in the input image, and (ii) the range of pixel values included in the two-dimensional array of pixel values; adjusting the intensity value of the particular pixel based on the scaling factor to generate a scaled intensity value of the particular pixel; combining the scaled intensity value of the particular pixel and the particular pixel value having the coordinate location within the two-dimensional array corresponding to a coordinate location of the particular pixel within the input image to generate a combined value for the particular pixel; and dividing the combined value by a value representing a horizontal dimension of the two-dimensional of the two-dimensional array of pixel values to generate an adjusted intensity value of the particular pixel.

In some implementations, the transformed image is a monochrome image. In such implementations, adjusting the intensity value of the particular pixel further includes setting the adjusted intensity value of the particular pixel to a value equal to either 0 or 1.

In some implementations, the method further includes the operations of: obtaining a color photograph of an individual; converting pixel intensity values of pixels included in the color photograph to grayscale intensity values; and generating the input image of the individual based on converting pixel intensity values of pixels included in the color photograph to grayscale intensity values.

In some implementations, the dithering pattern is included in an entire region of the transformed image.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, a system is capable of generating identifications that include distinctive line patterns corresponding to different portions of secure customer information. For example, the system may construct or modify photographic images of an identification, such as a customer photo, a background pattern, or a portion of text, using line patterns that include different line thicknesses and line spacing. The system can then associate each line pattern with a corresponding portion of secure customer information. The system can also place multiple line patterns in different regions of the photographic images within the identification.

A "customer" may refer to a user or individual. For example, a customer may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

A customer may be provided with a physical or digital identification by enrolling into an identification program offered by an issuing authority. The issuing authority can be a digital identification administrator that issues digital identifications in addition to, or as an alternative to, physical identifications. In some instances, the issuing authority may authorize a third-party organization, such as the digital identification administrator, to manage the issuance, maintenance, and renewal of identifications.

A customer may opt to enroll into the identification program using various methods such as, for example, an online enrollment process, a form submission, or through an oral agreement with an authorized representative. The issuing authority may then create a customer account including customer information in an identification database. For instance, the customer information may include one or more of an email address, an identification number, a customer photograph, and other types of demographic information (e.g., home address) associated with the customer. The identification database can also indicate to the issuing authority that an entry for the customer has been successfully created once the entry for the customer has been created.

The enrollment process for the identification program can include the use of various methods to receive customer information, such as, for example, the use of email, the use of a customer token such as a personal identification number (PIN), and/or the use of customer biometric parameters.

Figure 1A:
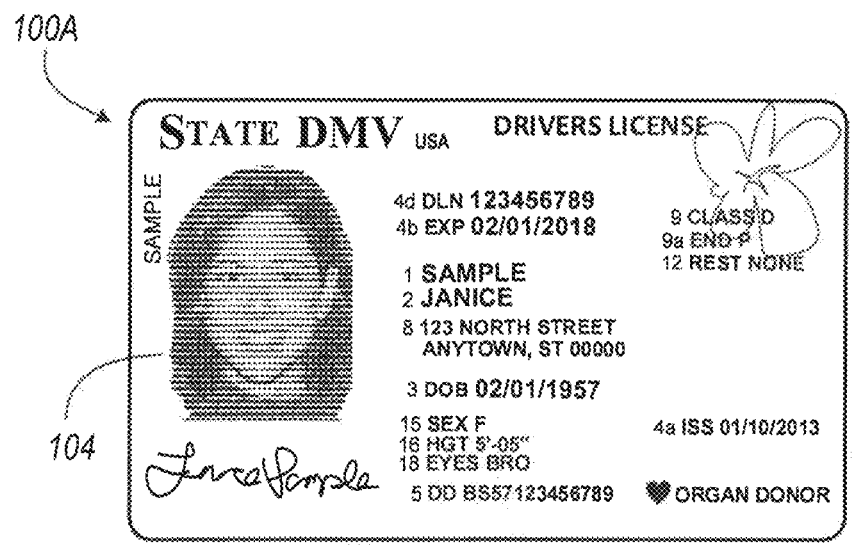
FIG. 1A illustrates an example of an identification with a dithering pattern embedded within a photograph.

FIG. 1A illustrates an example of an identification 100A with a dithering pattern embedded within a photograph 104. Although the example in FIG. 1A depicts the identification 100A as a physical identification, in other implementations, the techniques discussed herein can be applied to other types of identifications, such as a digital identification, as depicted in in FIG. 1B.

The identification 100A is issued by an issuing authority (e.g., a state department of motor vehicles). The identification 100A includes a photograph 104 of an individual such as a cardholder of the identification 100A. The photograph 104 includes an embedded line pattern adjusts the display of the original photograph while preserving certain underlying attributes of the photograph such as the ability to recognize the individual in the photograph. The photograph 104 can represent different types of images. In some instances, the photograph 104 is a color photograph of an individual that associated with the identification 100A. In other instances, the photograph 104 is a grayscale photograph of the individual. The photograph 104 can be captured by an issuing authority during an issuance process of the identification 100A. The photograph 104 can be inserted to the identification 100A in a processed and/or adjusted format of a captured photograph of an individual.

In the example illustrated in FIG. 1A, the photograph 104 is an image that includes a particular dithering pattern that identifies the individual within the photograph 104. The dithering pattern can be generated based on processing an input image using a dithering matrix, as discussed in detail below with respect to FIG. 2. As shown in FIG. 1A, a dithering matrix is used to generate a dithering pattern with parallel horizontal lines. In other examples, other types of dithering patterns may also be used (e.g., dithering patterns with vertical parallel lines, diagonal parallel lines, waves, etc.).

Although FIG. 1A illustrates line patterns being embedded within a physical identification, in other instances, the line patterns can also be embedded within a digital identification (e.g., a digitally issued driver license). In addition, although the example depicted illustrates visibly detectable line patterns (e.g., visible to a human eye), in other instances, the line patterns can be constructed small enough to appear invisible to the human eye. In such instances, the line patterns can outline micro-features of the photograph 104 (or other portions of the identification 100A). For example, the dithering pattern can additionally or alternatively be applied to background graphical elements of the identification 100A.

The variable line pattern can be embedded into an input photograph of the individual during a fabrication and issuance process for the identification 100A. For example, for physical identifications, a system associated with the issuing authority of the identification 100A may adjust the input image using a dithering matrix and then print the adjusted image onto the physical identification. The dithering matrix can be used to adjust certain visual attributes of the input image while maintaining the ability to recognize, for example, the identity of an individual within the photograph 104. The generate the photograph 104 prior to printing the identification. In examples relating to digital identifications, the system can obtain the photograph 104 to include within the digital identification during the identification generation process. More particular descriptions related to generating the photograph 104 in relation to the document generation and/or issuance process is provided below with respect to FIG. 2.

Figure 1B:
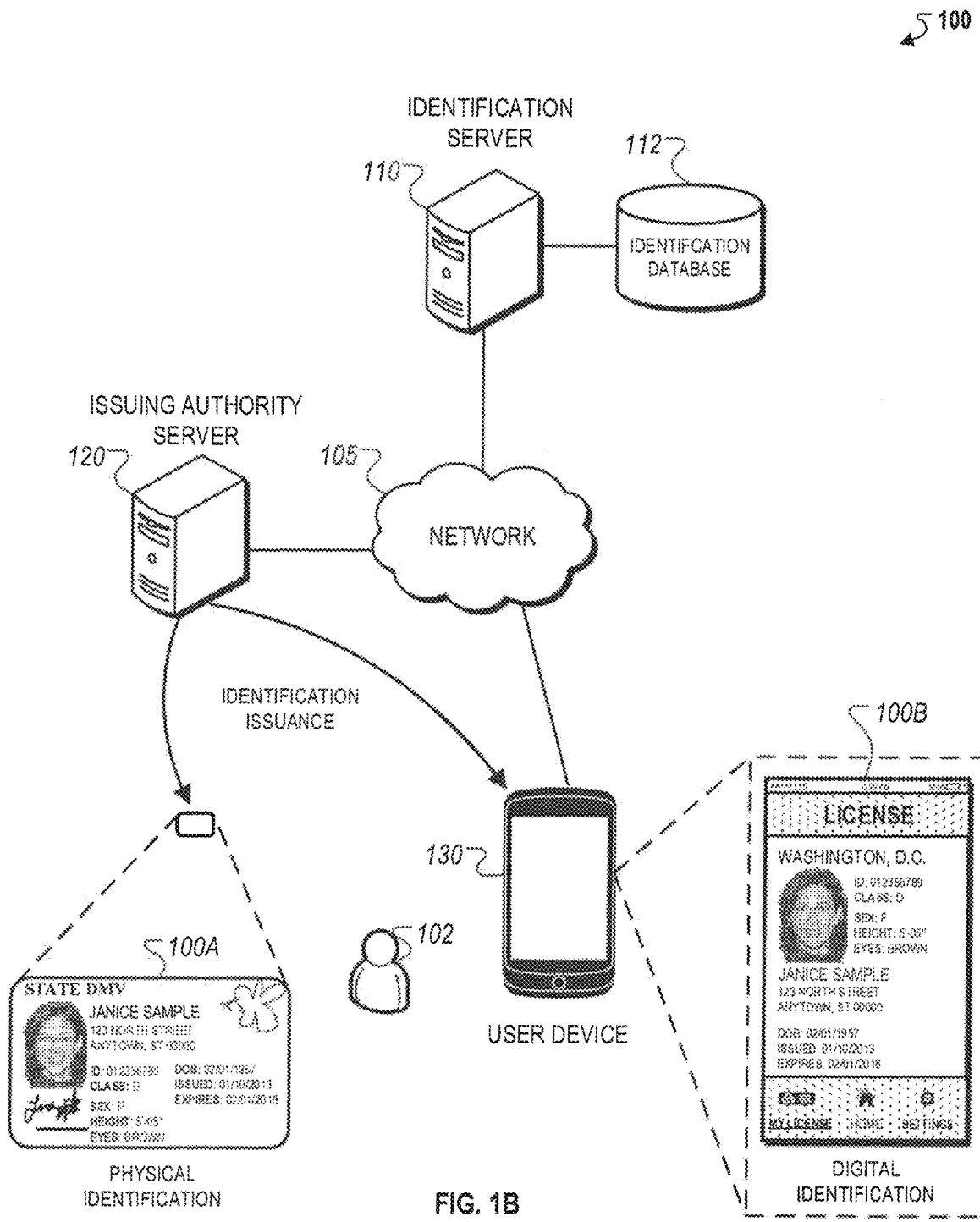
FIG. 1B illustrates an example of a system that can generate identifications with embedded dithering patterns.

FIG. 1B illustrates an example of a system 100 for generating identifications with embedded dithering patterns. The system 100 can be used for various processes associated with a physical identification 100A and/or a digital identification 100B (e.g., fabrication, issuance, renewal, maintenance, etc.). The system 100 can also be used to enroll customers into an identification program, and provision the identifications 100A, 100B to enrolled customers.

As shown in FIG. 1B, the system 100 generally includes an identification server 110, an issuing authority server 120, and a customer device 130 connected over a network 105. The identification server 110 can also be configured to exchange communications with an identification database 112. In addition, the customer device 130 may display the digital identification 100B on a user interface presented to a customer (e.g., a customer or any other authorized user) on the customer device 130. The digital identification 100B can be a digital form of the physical identification 100A issued by an issuing authority associated with the issuing authority server 120. In the example depicted in FIG. 1B, the digital identification 100B is a digital driver license issued to a customer 102 by the state department motor vehicle that issues a physical driver license.

In general, the system 100 can be used to fabricate and issue identifications 100A, 100B with embedded dithering patterns. As described above, the embedded dithering patterns can be included to enable the system 100 to, for example, verify the authenticity of the identifications 100A, 100B. For example, if an identification of the customer 102 is presented by a user does not have a particular type of dithering pattern associated with the identifications 100A, 100B, the system 100 can determine that the presented identification is either a fraudulent or expired copy.

During an issuance process of the identifications 100A, 100B, the identification server 110 can initially generate one or more dithering patterns to include within, for example, a photograph of a newly generated identification. The identification server 110 can generate a dithering pattern based on generating a dithering matrix that is used to adjust an input image to generate a dithered image that is inserted into the identifications 100A, 100B, as discussed in more detail with respect to FIG. 2. The verified credential information stored within a customer record of the identification database 112 can be associated with the dithering patterns. The verified credential information can include data collected and vetted by a government entity (e.g., department of motor vehicles).

The identification database 112 can include a dithering pattern repository that store data relating to different types of dithering patterns. For example, the dithering pattern repository can include records for dithering patterns that were previously used by, for example, the issuing authority to generate and/or fabricate the identifications 100A, 100B. For example, if a different dithering pattern used to fabricate the identification 100A each time a physical identification is issued to the customer 102, the identification database 112 can store the different dithering patterns that were previously used and the dithering pattern currently being used for newly issued physical identifications and/or physical identifications to be issued. As another example, if a different dithering pattern is used to generate time-dependent versions of identification 100B, then the identification database 112 can store the different dithering patterns being circulated for generating the different versions of the identification 100B.

In both of the examples discussed above, the identification database 112 can store associated information, such as a time period during which a particular dithering pattern was used to generating the identifications 100A, 100B, or dithering matrixes that are applied to input images to generate images to be inserted into the identifications 100A, 100B. In this regard, the information stored within the identification database 112 can be used to track the validity of a particular identification. For example, if the particular identification includes an image with a dithering pattern that is identified in the identification database 112 as being expired, then the system 100 can determine that the particular identification is not valid for identity verification purposes. As another example, a time period associated the dithering pattern in the identification database 112 can be used to determine when the particular identification was issued and/or fabricated.

Figure 2:
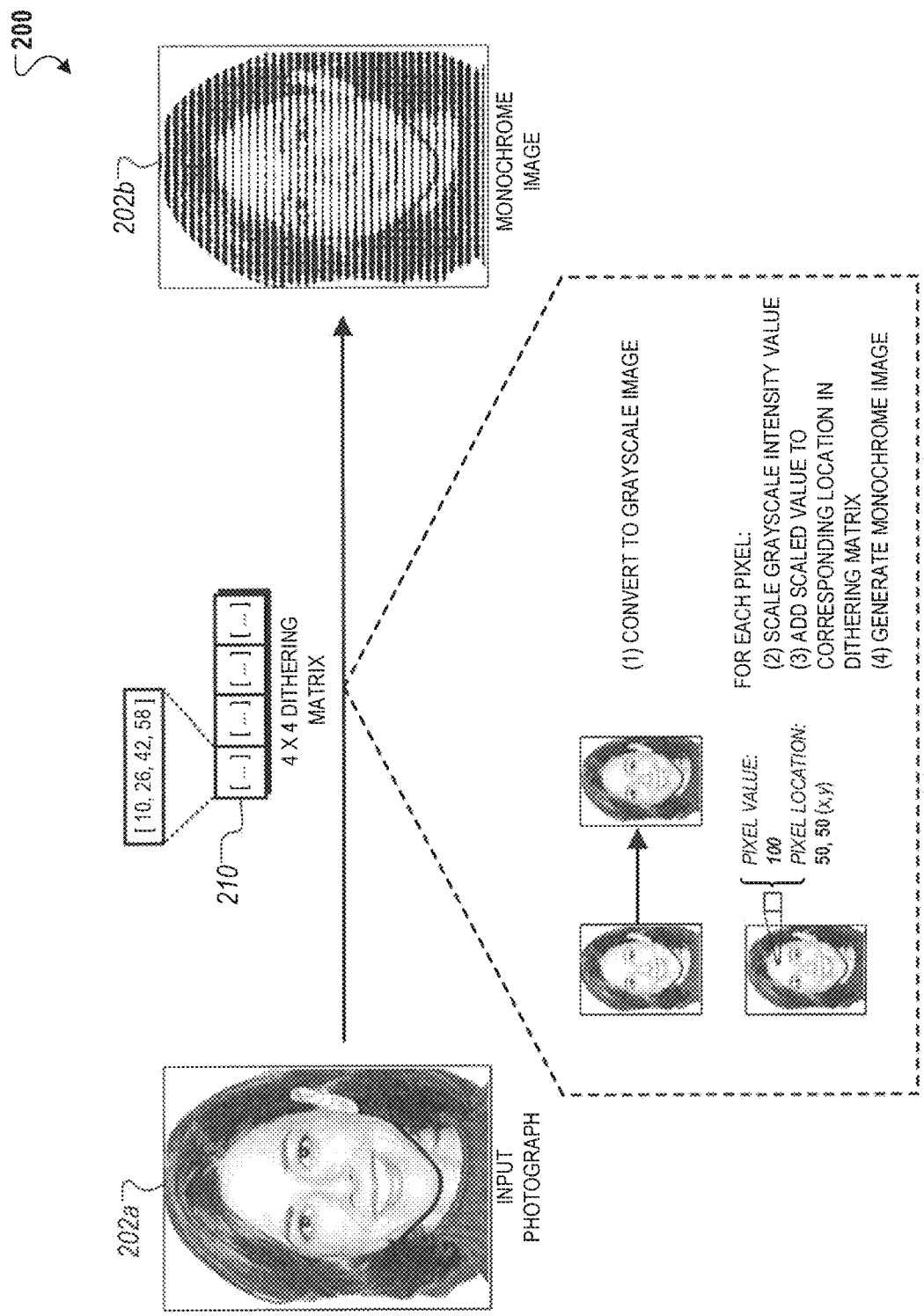
FIG. 2 illustrates an example of a process that uses a dithering matrix to generate a monochrome image with a dithering pattern from a customer photograph.

The identification server 110 can process input images using the process depicted in FIG. 2 to generate processed images with dithering patterns. The processed images can be used to generate and/or fabricate the identifications 100A, 100B. For example, the identification server 110 can apply a dithering matrix to process an input image and generate an image with a dithering pattern corresponding to the particular dithering matrix. With the case of physical identifications in particular, the process image generated by the identification server 110 can be printed onto the surface of the physical identification. With the case of digital identifications, the identification server 110 can additionally store protocols and/or instructions for generating different versions of digital identifications using different dithering patterns that are applied to the same input image.

Referring now to the individual components of the system 100, the network 105 may be configured to enable electronic communications between the identification server 110, the issuing authority server 120, and the customer device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any network capable of carrying electronic communications (e.g., data or voice communications). For example, the network 105 may include networks based on the Internet Protocol (IP), or other comparable technologies.

The identification server 110 can be a remote server that is monitored and operated by an organization or institution that is authorized by an issuing authority to generate and/or fabricate the identifications 100A, 100B to be issued to customers. In some instances, the organization or institution operating the identification server 110 can be an organization that is designated by the issuing authority to access identification information for multiple customers who have been issued a physical or a digital identification. In other instances, the organization or institution operating the identification server 110 can be the issuing authority (e.g., a government institution) that issues an identification to the multiple customers.

The identification server 110 can coordinate and/or administer the backend processes that are involved in generating, fabricating, and provisioning the identifications 100A, 100B to multiple customers such as the customer 102. For example, the identification server 110 can initiate processes to enroll customers with the identifications 100A, 100B, and operate security protocols to detect potential fraudulent uses or privacy breaches associated with the identifications 100A, 100B. In some instances, the processes related to the identifications 100A, 100B, as discussed throughout, can be coordinated with the issuing authority server 120, to ensure that secure customer information that includes personally identifiable information are not exposed during the provisioning of the identifications 100A, 100B.

As described throughout, secure customer information may refer to customer information within the identifications 100A, 100B that may include personally identifiable information associated with the customer. For example, secure customer information can include social security numbers, place of residence, and/or other demographic information that is associated with other types of information that the customer considers private. In addition, the secure customer information may include medical records of the customer that are protected under the Health Insurance Portability and Accountability Act of 1996 (HIPAA). Access to the secure customer information within the identifications 100A, 100B can be restricted by associated the secure customer information to different dithering patterns and specifying the associations within the identification database 112 as described above.

The identification server 110 can exchange communications with the identification database 112, which includes customer information for enrolled customers and/or other configuration details related to the identification program as discussed above. For example, the identification database 112 can include a customer entry associated with a customer that includes account information associated with enrolled customers, and any type of customer information that may be provided by the customer during a digital identification enrollment process.

In some implementations, the identification database 112 can include customer entries for both customers that are enrolled in the identification program and potential customers that the identification server 110 has identified as customers that are likely to enroll in the identification program. For example, the identification database 112 can include a field that indicates whether a customer entry is associated with an enrolled customer or a potential customer. In such implementations, the identification database 112 can be accessed by the identification server 110 to retrieve customer information for the digital identifications 100A, 100B associated with an enrolled customer, and customer information for a candidate customer in order to send an enrollment email that provides an enrollment code to the candidate customer.

In some implementations, the customer entry for enrolled customers may be automatically created by the identification server 110 within the identification database 112. In such implementations, the customer may submit an online enrollment form including a set of user fields for providing customer information. In response, the identification server 110 may initiate a computer-implemented procedure that automatically generates a customer entry for the customer in the identification database 112 and inserts the values submitted for the set of user fields as customer information that is included in the customer entry.

In some implementations, the identification server 110 can additionally exchange communications with an image server, which stores photographs associated with an identification. In some implementations, the image server is operated by a separate entity or organization that operates the identification server 110. For instance, in such implementations, the image server may be operated by the issuing authority. In other implementations, the image server may be operated by the authorized issuing authority that also operates the identification server 110. In such implementations, the image server may be a sub-component of the identification server 110.

The issuing authority server 120 can be a remote server that is operated by the issuing authority and used to control access to secure customer information that is included in the identifications 100A, 100B issued by the issuing authority. For instance, the issuing authority server 120 can provide access to customer demographic information, historical customer information (e.g., previous identification cards issued, number of renewals, etc.), and/or other types of customer information using authorization procedures that require validation of access credentials. For example, upon receiving a request for the secure customer information by the identification server 110, the issuing authority server 120 may require an exchange of the access credentials to validate an authorized request.

The issuing authority server 120 can be queried by the identification server 110 for accessing, obtaining, and/or modifying secure customer information during an operation relating to the identifications 100A, 100B. For example, during an enrollment process, after a customer has opted to enroll into an identification program, the identification server 110 can query the issuing authority server 120 using a customer identifier number to extract secure customer information to be included in the identifications 100A, 100B. In another example, during a verification operation, the identification server 110 can access the issuing authority server 120 to determine whether a digital identification for a customer includes false customer information indicative of a fraudulent identification document.

In some implementations, the issuing authority server 120 can be configured with additional security protocols compared to the identification server 110 to protect sensitive customer information associated with a customer account. For example, in some instances, the issuing authority server 120 can be associated with a Federal government agency that manages nationwide programs that require specialized access (e.g., a government clearance). In such instances, the identification server 110 can be configured to access the secure customer information stored within the issuing authority server 120 under a special security agreement that ensures that the exchange of the secure customer information is controlled and regulated according to Federal privacy statutes. For example, the issuing authority server 120 may track information related to each exchange with the digital identification server 110 such that in the event that the identification server 110 determines that a particular identification is invalid, a notification may be received by the issuing authority server 120 to take additional security measures to protect more sensitive customer information that may be associated with, but not included in, the identification. In this regard, the exchange of communication between the identification server 110 and the issuing authority server 120 can be utilized to ensure protection of customer information beyond the customer information included in the identifications 100A, 100B.

The customer device 130 can be a portable electronic computing device that displays the identification 100B that is issued as a digital identification to the customer 102. For instance, the customer device 130 may be, for example, a smart phone, a tablet computer, a laptop computer, a personal digital assistant device, an electronic pad, a smart watch, a smart glass, or any electronic device with a display that is connected to a network.

The customer device 130 exchanges communications with the identification server 110 to receive and transmit enrollment information related to the identification program, customer data that is included in the identifications 100A, 100B, credential data used to verify the authenticity of the identifications 100A, 100B, and/or configuration settings that adjust the display of the identifications 100A, 100B (either as a physical identification document, or alternatively, through a user interface displayed on the customer device 130). For example, during an online enrollment process, the customer 102 can use the customer device 130 to input customer information and an assigned access code for the identification program. This information can be transmitted to the identification server 110 to generate the identification 132. In another example, during a verification process, when the identification 132 is enabled on the customer device 130, a data packet including credential data may be transmitted to the digital identification server 110 to determine whether the identifications 100A, 100B are still valid or includes accurate information. In this example, if the digital identification server 110 determines that the credential data is valid, then the identification can also be determined to be valid. Alternatively, if the identification server 110 determines that the credential data is not valid, then the identifications 100A, 100B can be determined to be invalid.

In some implementations, the customer device 130 can include a mobile application that exchanges communications to the identification server 110 as an application server. For example, the mobile application can be associated with a customer account that is stored on the identification database 112. In addition, the mobile application can periodically exchange information related to the security status assigned by the identification server 110 to determine whether the identifications 100A, 100B are valid. For example, the mobile application provide token data associated with the identification 100B that restricts and/or permits use of the identification 100B. In some instances, the mobile application may additionally or alternatively include various displays of the identification 100B such that the mobile application may be used as a replacement form of the identification 100A.

The identification 100A can represent a physical identification document that is directly issued to the customer 102. For example, as depicted in FIG. 1A, the identification 100A can be a driver license. Other examples include a password, an employee identification document, among others. The identification 100B can represent a digital identification that complements, or alternatively, replaces a corresponding physical identification. The identification 100B can be displayed on a user interface on the customer device 130. Each of the identifications 100A, 100B can include a photograph of a customer, a customer identifier, categorical data (e.g., identification classification), demographic information (e.g., sex, height, eye color, home address), date of birth, etc.), and issuance information associated with a corresponding physical identification card.

FIG. 2 illustrates an example of a process 200 for generating a monochrome image 202b with an embedded dithering pattern based on an input photograph 202a. The operations of the process 200 can be executed by one or more components of the system 100, such as the identification server 110, the issuing authority server 120, or a combination thereof.

As shown in the figure, the system 100 applies a dithering matrix 210 to the photograph 202a to perform pixel-by-pixel transformations to generate the monochrome image 202b. By applying the dithering matrix 210, the system 100 adjusts the value of each pixel within the photograph 202a such that the output produces the monochrome image 202b.

The dithering matrix 210 can represent a two-dimensional array of values. The array can have different dimensions that can be used to adjust the resolution of the monochrome image 202b that is ultimately produced from the photograph 202a. For example, applying a dithering matrix with a 16-by-16 array can generate a monochrome image with a higher number of lines (e.g., with greater image detail) than applying a dithering matrix by a 4-by-4 array. In the example depicted in FIG. 2, the dithering matrix 210 represents a 4-by-4 dithering matrix. In other implementations, dithering matrixes with arrays of other dimensions (e.g., 6-by-6 array, 8-by-8 array, etc.) can also be applied to generate the monochrome image 202b based on the photograph 202a.

In general, the visual attributes of the embedded dithering pattern (or embedded line pattern) within the monochrome image 202b is based on various factors associated with the dithering matrix used to generate the monochrome image 202b. Examples of visual attributes that can be adjusted include line pattern frequency, type of pattern, among others. Examples of factors associated with the dithering matrix can include dimensions of the dithering matrix, values included within the dithering matrix, and the arrangement of individual values within the dithering matrix. These factors can be adjusted to generate different types of embedded line patterns within the monochrome image 202b. For instance, although FIGS. 1A, 1B and 2 illustrate parallel horizontal line patterns, in other implementations, the system 100 is capable of generating other types of embedded patterns. For example, other types of embedded line patterns include a vertical parallel line pattern, a diagonal parallel line pattern at a specified angle, a cross-hatch pattern, among others.

Referring now to the process 200, the system 100 initially converts the input photograph 202a into a grayscale image if the photograph 202a is a color photograph. The system 100 then performs an iterative pixel transformation procedure that is used to adjust an initial pixel value within the photograph 202a to the final pixel value within the monochrome image 202b. For instance, the system 100 initially adjusts the grayscale intensity value to correspond to a range of values included within the dithering matrix 210. For example, the range of values within the dithering matrix 210 is from "0" to "63" and the original grayscale pixel scale range is from "0" to "255." In this example, each pixel value is divided by four to adjust the pixel value range from the original grayscale pixel scale range to the range of values within the dithering matrix. As a result, the adjusted pixel range of the pixels in the photograph 202a matches the pixel range specified within the dithering matrix. In the example, dividing each of the pixels by a factor four results in an adjusted pixel range of "25" for an original pixel value of "100." In this example, the maximum pixel value is "63.75" ("255" divided by four).

The system 100 then applies a transformation of the dithering matrix such that the scaled pixel value of each pixel in the photograph 202a is, for instance, added to a value within the dithering matrix that has a matrix location that corresponds to the image location of the pixel. For example, if an image location of a particular pixel within the photograph 202a is (50, 50) in a 100 pixel by 100-pixel photograph, then the corresponding location within the dithering matrix is ([50% (horizontal dimension of dithering matrix)], [50% (vertical dimension of dithering matrix)]), where "%" is a "mod" operator that calculates the remainder when divided by a denominator. In the example, the system 100 adds the scaled pixel value and the corresponding value within the dithering matrix. Each of the respective sums of the pixels of the photograph 202a are then divided by a particular divider value to generate a final pixel value for the particular pixel within the monochrome image 202b. This operation is performed such that the monochrome image 202b includes, for example, one of two pixel values (e.g., "0" and "1"). In one particular implementation, the system 100 designates a value based on rounding the value to between "0" and "1." For example, the final pixel value "0.24" can be adjusted to "0" and "0.74" can be adjusted to "1").

The system 100 repeats the transformation discussed above for each pixel within photograph 202a the such that the values of all pixels within the photograph 202a are adjusted to their final pixel values. Once the system 100 performs the transformation for all pixels within the photograph 202a, the output is the monochrome image 202b illustrated in FIG. 2.

Figure 3:
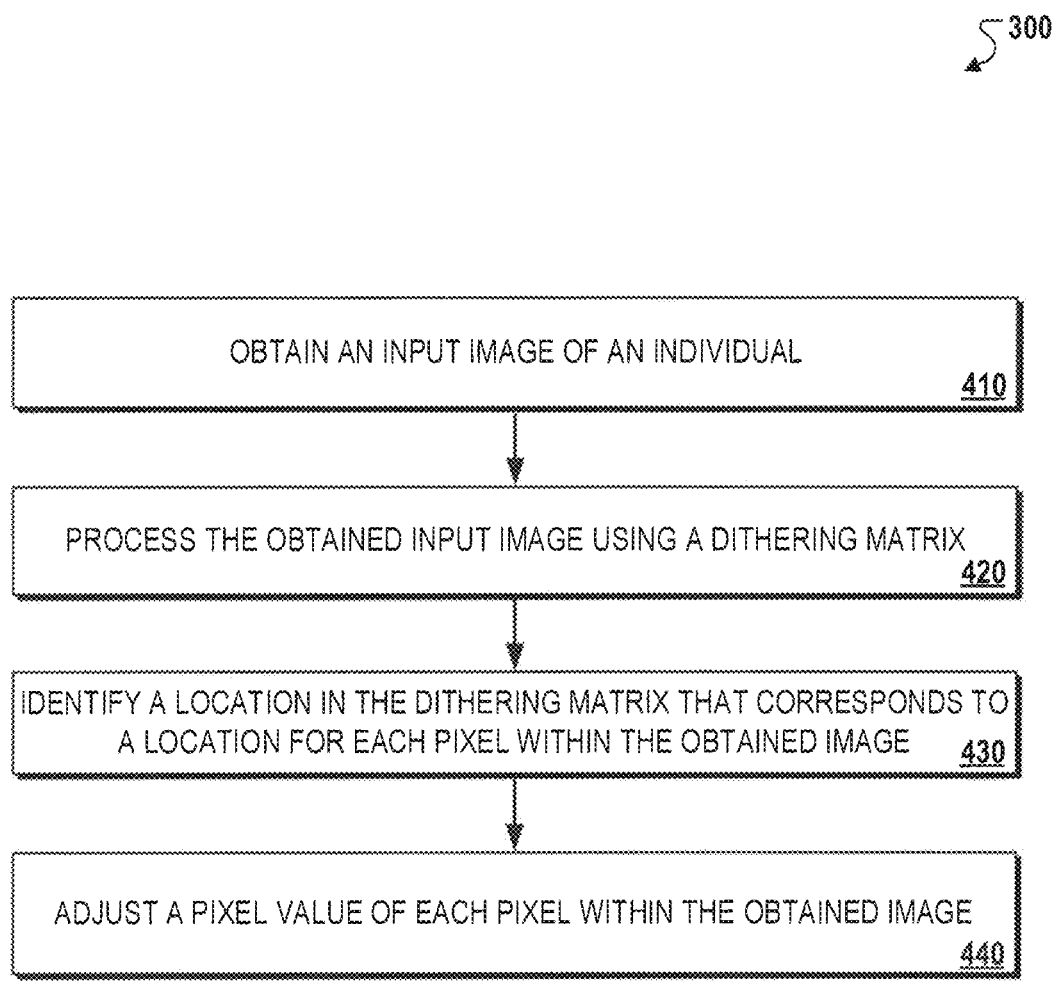
FIG. 3 illustrates an example of a process for generating a monochrome image with a dithering pattern.

FIG. 3 illustrates an example of a process 300 for generating a monochrome image with a dithering pattern. Briefly, the process 300 can include obtaining an input image of an individual (310), processing the obtained input image using a dithering matrix (320), identifying a location in the dithering matrix that corresponds to a location for each pixel within the obtained image (330), and adjusting a pixel value of each pixel within the obtained image (340). The process 300 may be executed by one or more computers associated with an issuing authority that issues the identification 100A illustrated in FIG. 1A.

In more detail, the process 300 can include obtaining an input image of an individual (310). For instance, a system may obtain the photograph 202a of an individual associated with the identification 100A. As illustrated in FIG. 2, the photograph 202a can be a color photograph or a grayscale photograph.

The process 300 can include processing the obtained input image using a dithering matrix (320). For instance, the system processes the photograph 202a using the dithering matrix 210. The output of the processing is the monochrome image 202b. As illustrated in FIG. 2, the monochrome image 202b includes an embedded dithering pattern in at least a portion of the image. For example, in some instances, the dithering pattern may encompass the entire region of the monochrome image 202b (e.g., as illustrated in FIGS. 1 and 2). In other instances, the dithering pattern may encompass only a portion of the monochrome image 202b (e.g., in a top-left region of the image). The pixels of the monochrome image 202b only includes binary values as described above.

The process 300 can include identifying a location in the dithering matrix that corresponds to a location for each pixel within the obtained image (330). For instance, as described above the system processes the photograph 202a on a pixel-by-pixel basis. In processing each pixel within the photograph 202a, the system initially identifies a value in the corresponding location of the dithering matrix as described above with respect to FIG. 2.

The process 300 can include adjusting a pixel value of each pixel within the obtained image (340). For instance, after the system has identified a value within the dithering matrix that corresponds to the location of a pixel within the photograph 202a, the system then adjusts the value of the pixel within the photograph 202a. For example, the system adjusts the pixel value by initially adjusting the pixel grayscale value based on the range of values within the dithering matrix. The system then adds the scaled grayscale value to the value in the corresponding location of the dithering matrix as identified in step 330. The sum is then divided by a particular divider and then rounded to either "0" or "1" to obtain the final pixel value within the monochrome image 202b.

Figure 4:
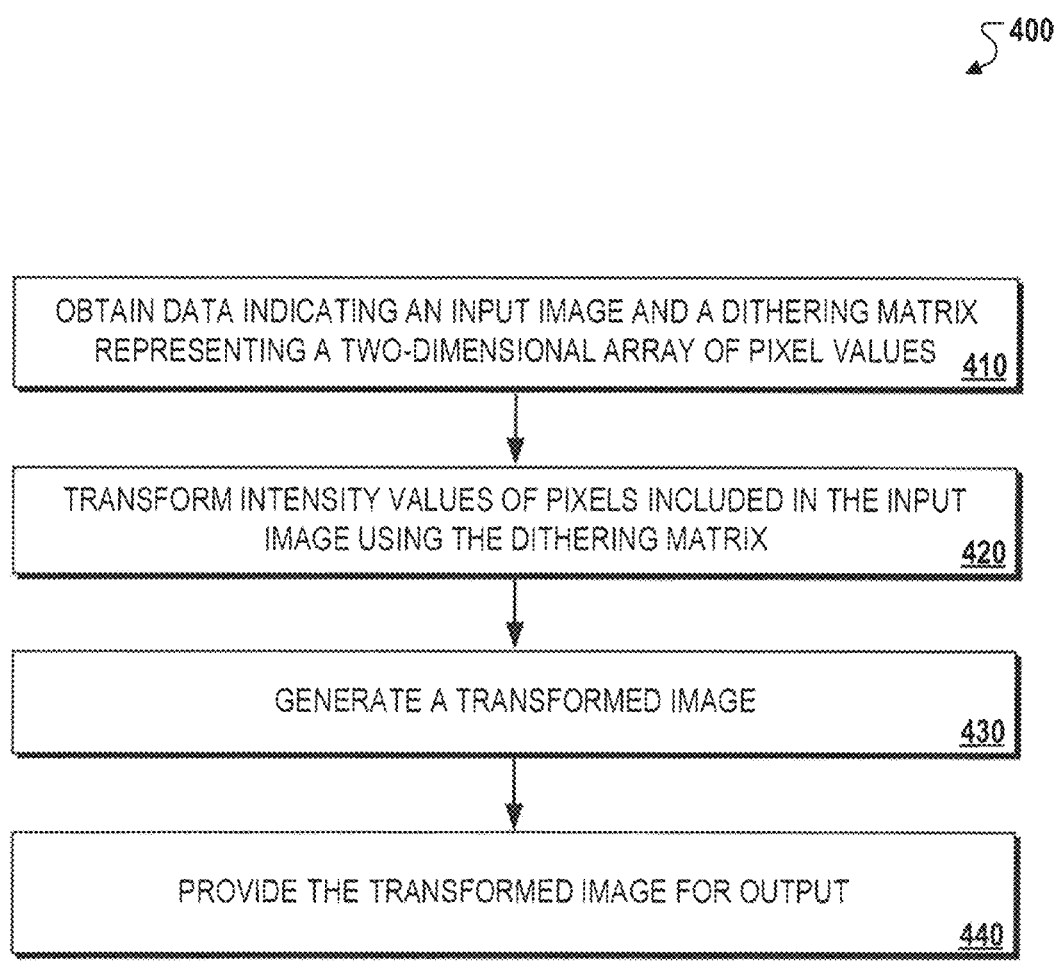
FIG. 4 illustrates an example of a process for transforming an input image using a dithering matrix.

FIG. 4 illustrates an example of a process 400 for transforming an input image using a dithering matrix. Briefly, the process 400 can include the operations of obtaining data indicating an input image and a dithering matrix representing a two-dimensional array of pixel values (410), transforming intensity values of pixels included in the input image using the dithering matrix (420), generating a transformed image (430), and providing the transformed image for output (440).

In general, the process 400 can be performed by one or more components of the system 100, such as the identification server 110, the issuing authority server 120, or a combination of both. Additionally, although the process 400 is discussed below in reference to the system 100, the operations of the process 400 can be performed by any image processing system. In some implementations, the operations of the process 400 are performed prior to printing and/or fabricating a physical identification that is to include an image with a dithering pattern. Alternatively, in other implementations, the operations of the process 400 are performed in relation to generating a digital identification that is used as a complement, or as a replacement, of a physical identification.

In more detail, the process 400 can include the operations of obtaining data indicating an input image and a dithering matrix representing a two-dimensional array of pixel values (410). For example, as shown in FIG. 2, the identification server 110 can obtain data indicating an input image that is a photograph of an individual, such as the photograph 202a. The identification server 110 can also obtain data indicating the dithering matrix 210. As discussed above, the dithering matrix 210 represents a two-dimensional array of pixel values. In the example depicted in FIG. 2, the dithering matrix 210 is a 4-by-4 array of values. In other examples, dithering matrices of other dimensions can also be used.

The process 400 can include the operation of transforming intensity values of pixels included in the input image using the dithering matrix (420). For example, the identification server 110 can transform intensity values of pixels included in the photograph 202a using the dithering matrix 210. The transformation can include performing a set of pixel-by-pixel operations. For instance, the identification server 110 can identify a particular value within the dithering matrix 210 that represents a particular pixel within the photograph 202a. As discussed above with respect to FIG. 2, the particular pixel value has a coordinate location within the two-dimensional array that corresponds to a coordinate location of the particular pixel within the photograph 202a. For example, the photograph 202a can be a 100-by-100-pixel image, the coordinate location of the particular pixel is (50, 60), and the two-dimensional array of pixel values is an 8-by-8 array. In this example, the particular pixel value within the two-dimensional array of pixel values would be represented by the pixel value at coordinate location (2,4) within the two-dimensional array of pixel values.

The pixel-by-pixel transformation for each pixel within the photograph 202a can then include adjusting an intensity value of the particular pixel based on attributes of the dithering matrix 210. For example, as discussed above, the attributes of the dithering matrix 210 includes horizontal and vertical dimensions of the two-dimensional array of pixel values (e.g., an 8-by-8 array), a range of pixel values included in the two-dimensional array of pixel values (e.g., pixel values between "0" and "63"), and an arrangement of pixel values within the two-dimensional array of pixel values (e.g., the magnitudes of individual values relative to other values in the two-dimensional array of pixel values).

The identification server 110 can adjust the intensity value of the particular pixel based on performing a set of operations as depicted in FIG. 2. For instance, the identification server 110 determines a scaling factor based on the range of intensity values for pixels included in the input image, and the range of pixel values included in the two-dimensional array of pixel values. For example, as discussed above, the scaling factor can be used to reduce the range of the intensity values in the photograph 202a. The identification server 110 can then adjust the intensity value of the particular pixel based on the scaling factor to generate a scaled intensity value of the particular pixel. For example, the identification server 110 can divide the intensity value by the scaling factor to generate the scaled intensity value of the particular pixel (e.g., intensity value of "100" divided by a scaling factor of "4" to generate a scaled intensity value of "25"). The identification server 110 can combine the scaled intensity value of the particular pixel and the particular pixel value having the coordinate location within the two-dimensional array corresponding to a coordinate location of the particular pixel within the input image to generate a combined value for the particular pixel. In the example discussed above the scaled intensity value at coordinate location (50, 60) in the photograph 202a is added to the pixel value with a coordinate location (2,4) in the two-dimensional array of pixels of the dithering matrix 210. In this example, the addition of the scaled intensity value and the particular pixel value represents the combined value for the particular pixel. The identification server 110 can divide the combined value by a value representing a horizontal dimension of the two-dimensional of the two-dimensional array of pixel values to generate an adjusted intensity value of the particular pixel. For example, for an 8-by-8 dithering matrix, the combined value for the particular pixel can be divided by the value "8" to generate the adjusted intensity value of the particular pixel.

The process 400 can include the operation of generating a transformed image (430). For example, the identification image can combine the adjusted intensity values for each of the pixels of the photograph 202a to generate a transformed image that is represented by the monochrome image 202b. As discussed above with respect to FIG. 2, the identification server 110 generates the monochrome image 202b based on setting the adjusting intensity value of each pixel to either "0" or "1."

As discussed above, when generated, at least a portion of the transformed image includes a dithering pattern such as the horizontal line pattern depicted in FIG. 1A. In other implementations, the dithering pattern can also be a vertical line pattern, a diagonal line pattern, or patterns of specified shapes such as a wave. The shape of the dithering pattern can be adjusted based on the pixel values included in the two-dimensional array of pixels, as discussed above.

The process 400 can include the operation of providing the transformed image for output (440). For example, the identification server 110 can provide the transformed image to, for instance, the issuing authority server 120, for generating and/or fabricating the identifications 100A,100B. As discussed above with respect to FIG. 1B, the transformed image can be inserted into a physical identification document to be issued to the customer 102, or alternatively, to be inserted into a digital identification that is to be generated and provided to the customer device 130.

In some implementations, the process 600 further includes the following operations. The identification server 110 can obtain a color photograph of an individual such as a cardholder of an identification to be generated and/or issued. The identification server 110 can the color photograph to a grayscale image based on converting pixel intensity values of pixels included in the color photograph to grayscale intensity values. In such implementations, the identification server 110 can generate the provide the converted image as input to the perform the operations of the process 600 discussed above.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by one or more computers, the method comprising:
    obtaining data indicating (i) an input image, and (ii) a dithering matrix representing a two-dimensional array of pixel values;
    transforming, using the dithering matrix, values of pixels included in the input image, the transforming comprising, for each pixel within the input image:
        identifying a particular value within the dithering matrix that represents a particular pixel within the input image, the particular value having a coordinate location within the two-dimensional array corresponding to a coordinate location of the particular pixel within the input image, and
        adjusting a value of the particular pixel based on attributes of the dithering matrix;
    generating a transformed image based on transforming the values of the pixels included in the input image, wherein:
        at least a portion of the transformed image comprises a dithering pattern that includes distinctive line patterns outlining micro-features of the input image, and
        each of the distinctive line patterns corresponds to a different portion of secure customer information; and
    providing the transformed image for output.

2. The method of claim 1, wherein the attributes of the dithering matrix comprise at least one of:
    horizontal and vertical dimensions of the two-dimensional array of pixel values,
    a range of pixel values included in the two-dimensional array of pixel values, and
    an arrangement of pixel values within the two-dimensional array of pixel values.

3. The method of claim 2, wherein adjusting the value of the particular pixel comprises:
    determining a scaling factor based on (i) a range of values for pixels included in the input image, and (ii) the range of values included in the two-dimensional array of pixel values;
    adjusting the value of the particular pixel based on the scaling factor to generate a scaled value of the particular pixel;
    combining the scaled value of the particular pixel and the particular value having the coordinate location within the two-dimensional array corresponding to a coordinate location of the particular pixel within the input image to generate a combined value for the particular pixel; and
    dividing the combined value by a value representing a horizontal dimension of the two-dimensional of the two-dimensional array of pixel values to generate an adjusted value of the particular pixel.

4. The method of claim 2, wherein:
    the transformed image is a monochrome image; and
    adjusting the value of the particular pixel further comprises setting the adjusted value of the particular pixel to a value equal to either 0 or 1.

5. The method of claim 1, further comprising:
    obtaining a color photograph of an individual;
    converting values of pixels included in the color photograph to grayscale intensity values; and
    generating the input image of the individual based on converting values of pixels included in the color photograph to grayscale intensity values.

6. The method of claim 1, wherein:
the image is of an individual to be issued a physical identification by an issuing authority; and
the method further comprises providing, for output to a system associated with the issuing authority, an instruction to print the transformed image onto the physical identification.

7. The method of claim 1, wherein:
the secure information is associated with an individual to be issued a digital identification by an issuing authority; and
the method further comprises providing, for output to a system associated with the issuing authority, the transformed image for insertion into the digital identification.

8. The method of claim 1, wherein:
the input image comprises an image of an individual; and
the secure information comprises secure information of the individual.

9. The method of claim 1, wherein the input image comprises a representation of a graphical pattern.

10. The method of claim 1, wherein the input image comprises a two-dimensional array of pixels.

11. A system comprising:
one or more computers; and
one or more storage devices storing instructions that, when executed by the one or more computers, cause the one or more computers to perform operations comprising:
obtaining data indicating (i) an input image, and (ii) a dithering matrix representing a two-dimensional array of pixel values;
transforming, using the dithering matrix, values of pixels included in the input image, the transforming comprising, for each pixel within the input image:
identifying a particular value within the dithering matrix that represents a particular pixel within the input image, the particular value having a coordinate location within the two-dimensional array corresponding to a coordinate location of the particular pixel within the input image; and
adjusting a value of the particular pixel based on attributes of the dithering matrix;
generating a transformed image based on transforming the values of the pixels included in the input image, wherein:
at least a portion of the transformed image comprises a dithering pattern that includes distinctive line patterns outlining micro-features of the input image, and
each of the distinctive line patterns corresponds to a different portion of secure customer information; and
providing the transformed image for output.

12. The system of claim 11, wherein the dithering pattern comprises a vertical parallel line pattern.

13. The system of claim 11, wherein the attributes of the dithering matrix comprise at least one of:
horizontal and vertical dimensions of the two-dimensional array of pixel values,
a range of pixel values included in the two-dimensional array of pixel values, and
an arrangement of pixel values within the two-dimensional array of pixel values.

14. The system of claim 13, wherein adjusting the value of the particular pixel comprises:
determining a scaling factor based on (i) a range of values for pixels included in the input image, and (ii) the range of values included in the two-dimensional array of pixel values;
adjusting the value of the particular pixel based on the scaling factor to generate a scaled value of the particular pixel;
combining the scaled value of the particular pixel and the particular value having the coordinate location within the two-dimensional array corresponding to a coordinate location of the particular pixel within the input image to generate a combined value for the particular pixel; and
dividing the combined value by a value representing a horizontal dimension of the two-dimensional of the two-dimensional array of pixel values to generate an adjusted value of the particular pixel.

15. The system of claim 13, wherein:
the transformed image is a monochrome image; and
adjusting the value of the particular pixel further comprises setting the adjusted value of the particular pixel to a value equal to either 0 or 1.

16. The system of claim 11, wherein the operations further comprise:
obtaining a color photograph of an individual;
converting values of pixels included in the color photograph to grayscale intensity values; and
generating the input image of the individual based on converting values of pixels included in the color photograph to grayscale intensity values.

17. A non-transitory computer-readable storage device encoded with computer program instructions that, when executed by one or more computers, cause the one or more computers to perform operations comprising:
obtaining data indicating (i) an input image, and (ii) a dithering matrix representing a two-dimensional array of pixel values;
transforming, using the dithering matrix, values of pixels included in the input image, the transforming comprising, for each pixel within the input image:
identifying a particular value within the dithering matrix that represents a particular pixel within the input image, the particular value having a coordinate location within the two-dimensional array corresponding to a coordinate location of the particular pixel within the input image; and
adjusting a value of the particular pixel based on attributes of the dithering matrix;
generating a transformed image based on transforming the values of the pixels included in the input image, wherein:
at least a portion of the transformed image comprises a dithering pattern that includes distinctive line patterns outlining micro-features of the input image, and
each of the distinctive line patterns corresponds to a different portion of secure customer information; and
providing the transformed image for output.

18. The device of claim 17, wherein the dithering pattern comprises a vertical parallel line pattern.

19. The device of claim 17, wherein the attributes of the dithering matrix comprise at least one of:
horizontal and vertical dimensions of the two-dimensional array of pixel values,
a range of pixel values included in the two-dimensional array of pixel values, and an arrangement of pixel values within the two-dimensional array of pixel values.

20. The device of claim 19, wherein adjusting the value of the particular pixel comprises:
- determining a scaling factor based on (i) a range of values for pixels included in the input image, and (ii) the range of values included in the two-dimensional array of pixel values;
- adjusting the value of the particular pixel based on the scaling factor to generate a scaled value of the particular pixel;
- combining the scaled value of the particular pixel and the particular value having the coordinate location within the two-dimensional array corresponding to a coordinate location of the particular pixel within the input image to generate a combined value for the particular pixel; and
- dividing the combined value by a value representing a horizontal dimension of the two-dimensional of the two-dimensional array of pixel values to generate an adjusted value of the particular pixel.

\* \* \* \* \*